United States Patent
Li et al.

(10) Patent No.: US 10,858,725 B2
(45) Date of Patent: Dec. 8, 2020

(54) HIGH DENSITY BOND COAT FOR CERAMIC OR CERAMIC MATRIX COMPOSITES

(71) Applicants: Rolls-Royce Corporation, Indianapolis, IN (US); Rolls-Royce North American Technologies, Inc., Indianapolis, IN (US)

(72) Inventors: Li Li, Carmel, IN (US); Stephanie Gong, Indianapolis, IN (US); Matthew R. Gold, Carmel, IN (US); Ann Bolcavage, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 45 days.

(21) Appl. No.: 16/017,448

(22) Filed: Jun. 25, 2018

(65) Prior Publication Data
US 2018/0371600 A1    Dec. 27, 2018

Related U.S. Application Data

(60) Provisional application No. 62/524,825, filed on Jun. 26, 2017.

(51) Int. Cl.
*C23C 4/10* (2016.01)
*C23C 4/129* (2016.01)
(Continued)

(52) U.S. Cl.
CPC .................. *C23C 4/10* (2013.01); *C23C 4/04* (2013.01); *C23C 4/129* (2016.01); *C23C 4/134* (2016.01);
(Continued)

(58) Field of Classification Search
CPC ........... C23C 4/10; C23C 4/134; C23C 4/129; C23C 4/04
(Continued)

(56) References Cited

U.S. PATENT DOCUMENTS 9,890,089 B2     2/2018   Kirby et al.
2006/0222777 A1* 10/2006  Skoog .................... B05B 7/201
                                                       427/446
(Continued)

FOREIGN PATENT DOCUMENTS

| EP | 2561110 A1 | 2/2013 |
| EP | 2918698 A1 | 9/2015 |

(Continued)

OTHER PUBLICATIONS

Killinger et al., "Review of New Developments in Suspension and Solution Precursor Thermal Spray Processes," Journal of Thermal Spray Technology, vol. 20, No. 4, Jun. 2011, pp. 677-695.
(Continued)

*Primary Examiner* — Dah-Wei D. Yuan
*Assistant Examiner* — Nga Leung V Law
(74) *Attorney, Agent, or Firm* — Shumaker & Sieffert, P.A.

(57) ABSTRACT

A method that includes introducing a suspension comprising a coating material and a carrier into a heated plume of a thermal spray device. The coating material may include silicon or a silicon alloy. The method further includes directing the coating material using the heated plume toward a substrate that includes a ceramic or a ceramic matrix composite and depositing the coating material to form a bond coat directly on the substrate such that the bond coat defines a porosity of less than about 3 percent by volume.

18 Claims, 4 Drawing Sheets

(51) Int. Cl.
  *C23C 4/04* (2006.01)
  *C23C 4/134* (2016.01)
  *F01D 11/12* (2006.01)
  *F01D 25/00* (2006.01)

(52) U.S. Cl.
  CPC .......... *F01D 11/122* (2013.01); *F01D 25/005* (2013.01); *F05D 2230/311* (2013.01); *F05D 2230/312* (2013.01); *F05D 2230/90* (2013.01); *F05D 2240/11* (2013.01); *F05D 2240/12* (2013.01); *F05D 2240/30* (2013.01); *F05D 2240/35* (2013.01); *F05D 2300/222* (2013.01); *F05D 2300/514* (2013.01); *F05D 2300/6033* (2013.01); *F05D 2300/611* (2013.01)

(58) Field of Classification Search
  USPC .................................................. 427/446–456
  See application file for complete search history.

(56) References Cited

U.S. PATENT DOCUMENTS

| | | |
|---|---|---|
| 2008/0072790 A1 | 3/2008 | Ma et al. |
| 2010/0159150 A1* | 6/2010 | Kirby .................... C04B 41/009 427/452 |
| 2013/0101745 A1 | 4/2013 | Meillot et al. |
| 2014/0072816 A1* | 3/2014 | Lee ....................... C04B 41/009 428/448 |
| 2014/0193664 A1 | 7/2014 | Thompson et al. |
| 2014/0193760 A1 | 7/2014 | Nelson et al. |
| 2014/0272197 A1* | 9/2014 | Lee ....................... C23C 14/081 427/596 |
| 2016/0068941 A1 | 3/2016 | Nair et al. |
| 2016/0376691 A1* | 12/2016 | Wadley .................. C04B 41/89 428/141 |
| 2017/0016104 A1 | 1/2017 | Hazel et al. |

FOREIGN PATENT DOCUMENTS

| | | |
|---|---|---|
| EP | 2963141 A1 | 1/2016 |
| EP | 3101152 A1 | 12/2016 |
| WO | 2013163058 A1 | 10/2013 |
| WO | 2018073538 A1 | 4/2018 |

OTHER PUBLICATIONS

Response to Rule EPC 69 Communication dated Jan. 7, 2019 and Search Report from counterpart European Application No. 18175070.4, filed Jun. 17, 2019, 65 pp.

Berger et al., "Thermal Spraying with Suspensions—an Economic Spray Process," Thermal Spray Bulletin, Sep. 2013, pp. 98-101.

Extended Search Report from counterpart European Application No. 18175070.4, dated Jul. 26, 2018, 8 pp.

Fauchais et al., "Parameters Controlling Liquid Plasma Spraying: Solutions, Sols, or Suspensions," Journal of Thermal Spray Technology, vol. 17, No. 1, Mar. 2008, pp. 31-59.

\* cited by examiner

HIGH DENSITY BOND COAT FOR CERAMIC OR CERAMIC MATRIX COMPOSITES

This application claims the benefit of U.S. Provisional Application No. 62/524,825 filed Jun. 26, 2017, which is incorporated herein by reference in its entirety.

TECHNICAL FIELD

The present disclosure relates to bond coats and methods of forming bond coats on ceramic or ceramic matrix composite components.

BACKGROUND

Components of high-temperature mechanical systems, such as, for example, gas-turbine engines, operate in severe high-temperature environments. For example, the turbine blades and vanes of a gas turbine engine may be exposed to hot gases that may cause the surface of the component to reach temperatures in excess of 1000° C. The components of such high temperature mechanical systems may include metal alloys or ceramic-based materials, such as a ceramic or a ceramic matrix composite (CMC), that are designed to withstand such high temperatures. In some examples, coatings may be applied to components of high-temperature mechanical systems to reduce exposure of the substrate to environmental species, such as water vapor or oxygen, thermally insulate the underlying substrate from the heated exterior environment, or both. In some examples, coatings may include a bond coat to improve adhesion between the substrate and adjacent layers.

SUMMARY

In some examples, method may include introducing a suspension including a coating material and a carrier into a heated plume of a thermal spray device. The coating material may include silicon or a silicon alloy. The method may further include directing the coating material toward a substrate using the heated plume, in which the substrate includes a ceramic or a ceramic matrix composite. The method may include depositing the coating material to form a bond coat directly on the substrate, where the bond coat defines a porosity of less than about 3 volume percent.

In some examples, an article may include a substrate including a ceramic or a CMC and a bond coat deposited on a surface of the substrate using a suspension thermal spray technique to define a porosity of the bond coat of less than about 3 volume percent (vol. %). The bond coat may include silicon or a silicon alloy.

The details of one or more examples are set forth in the accompanying drawings and the description below. Other features, objects, and advantages will be apparent from the description and drawings, and from the claims.

DETAILED DESCRIPTION

Figure 1:
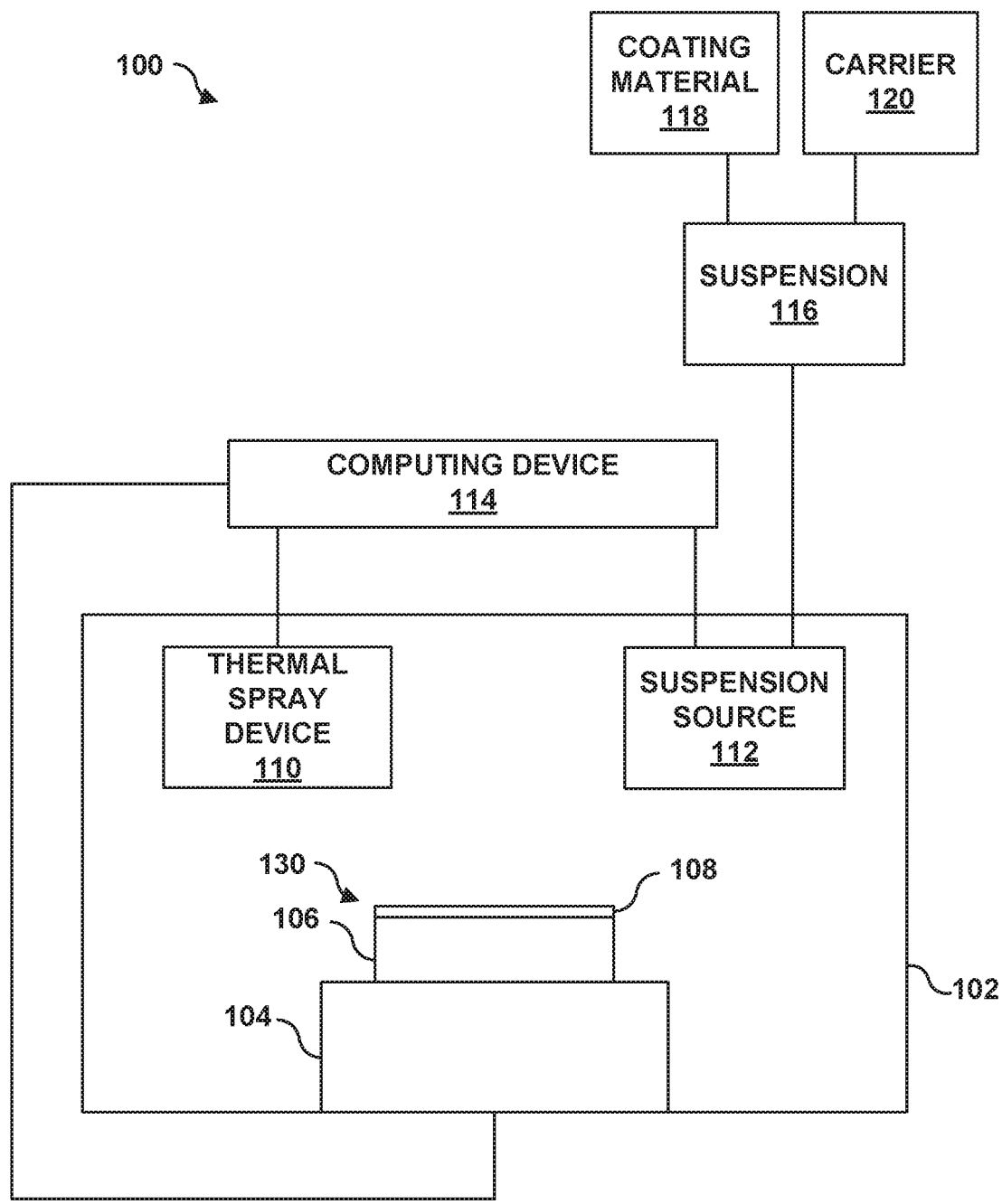
FIG. 1 is a schematic diagram illustrating an example system for depositing a silicon-based bond coat using a suspension thermal spray technique on a substrate that includes a ceramic or a CMC.

The disclosure describes suspension thermal spray techniques for forming a silicon-based bond coat and articles including a silicon-based bond coat formed using suspension thermal spray techniques. In some examples, the bond coat may be deposited on a surface of a substrate for a high-temperature mechanical system, such as a ceramic or a ceramic matrix composite (CMC) substrate, to promote adhesion between the substrate and one or more additional layers over the bond coat, including, for example, an environmental barrier coating (EBC); a thermal barrier coating (TBC); an additional bond coat; an abradable coating; a calcia-magnesia-alumina-silicate resistant (CMAS-resistant) layer; or combinations thereof.

In some examples, the one or more additional layers may reduce exposure of the substrate to deleterious environmental species, such as water vapor, oxygen, or other reactive compounds; thermally insulate the underlying substrate from a heated gas environment; or both.

As described herein, the silicon-based bond coat is deposited on a substrate using a suspension thermal spray technique. The suspension thermal spray technique may be used to form a silicon-based bond coat having a relatively low overall porosity (e.g., porosity of less than about 3 vol. %) and a resultant high density. The relatively low porosity and high density of the bond coat may help improve the protective properties of the bond coat as well as longevity of the bond coat. For example, the decreased porosity may reduce migration of deleterious environmental species through the bond coat to the substrate.

In some examples, the suspension thermal spray techniques described herein may be used to deposit a fine particle coating material (e.g., average particle size of less than about 25 µm, such as, for example, less than about 10 µm), which may not be practical with traditional thermal spray techniques, as such fine particles may result in agglomeration or fouling of the thermal spray device. In turn, the reduced particle size of the coating material permits a more compressed arrangement of the deposited particles resulting in a reduced porosity, reduced pore size, higher density, or a combination thereof, which may reduce or substantially prevent exposure of the surface of a substrate to deleterious environmental species, reduce or substantially prevent deterioration of the bond coat, and increase the service life of the substrate.

Additionally, or alternatively, the suspension thermal spray techniques described herein, may help reduce the overall production cost and time expended preparing the components for the silicon-based bond coat. For example, traditional thermal spray techniques require roughening of the surface of the underlying substrate material to promote sufficient adhesion of the spray material. Using the techniques described herein, the degree of roughening may be substantially reduced or eliminated to prior to the application a bond coat to the surface. In some examples, the surface roughness of the substrate may be less than about 50 microinch (e.g., about 1.27 μm) Ra. Eliminating or substantially reducing the amount by which the surface of the substrate needs to be roughened may reduce the chance of damaging the substrate during the roughening technique.

FIG. 1 is a schematic diagram illustrating an example system 100 for depositing a silicon-based bond coat 108 using a suspension thermal spray technique on a substrate 106 that includes a ceramic or a CMC to form article 130. System 100 includes a chamber 102 that encloses a stage 104 configured to receive substrate 106, a suspension source 112, a thermal spray device 110 that receives a suspension 116 (e.g., coating material 118 suspended in carrier 120) from suspension source 112, and a computing device 114 configured to control the feed of suspension 116 from suspension source 112 to thermal spray device 110 and the subsequent deposition of coating material 118 to form silicon-based bond coat 108 on substrate 106.

In some examples, substrate 106 may include a component of a gas turbine engine. For example, substrate 106 may include a part that forms a portion of a flow path structure, a seal segment, a blade track, an airfoil, a blade, a vane, a combustion chamber liner, or another portion of the gas turbine engine. As used herein, "formed on" and "on" means a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings. As shown in FIG. 1, bond coat 108 may be formed directly on substrate 106.

In some examples, substrate 106 may include a ceramic or a CMC. Suitable ceramic materials may include, for example, a silicon-containing ceramic, such as silica ($SiO_2$), silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 106 includes a ceramic, the ceramic may be substantially homogeneous.

In examples in which substrate 106 includes a CMC, substrate 106 may include a matrix material and a reinforcement material. The matrix material may include, for example, silicon metal or a ceramic material, such as silicon carbide (SiC), silicon nitride ($Si_3N_4$), silica ($SiO_2$), an aluminosilicate, a transition metal carbide or silicide (e.g., WC, $Mo_2C$, TiC, $MoSi_2$, $NbSi_2$, $TiSi_2$), other ceramics described herein; or combinations thereof. The CMC may further include a continuous or discontinuous reinforcement material. For example, the reinforcement material may include discontinuous whiskers, platelets, fibers, or particulates. Additionally, or alternatively, the reinforcement material may include a continuous monofilament or a multifilament two-dimensional or three-dimensional weave. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

The composition of the reinforcement material may be substantially the same (e.g., the same or nearly the same) as the composition of the matrix material. For example, a matrix material comprising silicon carbide may surround a reinforcement material including silicon carbide whiskers. In other examples, the reinforcement material includes a different composition than the composition of the matrix material, such as aluminosilicate fibers in an alumina matrix, or the like. In some examples, substrate 106 includes a SiC—SiC CMC such as silicon carbide fibers embedded in a matrix material of silicon carbide.

Bond coat 108 may be applied to substrate 106 using the suspension thermal spray techniques of the present disclosure. Bond coat 108 may promote adherence of an additional coating on bond coat 108 (e.g., an EBC, a TBC, an additional bond coat, an abradable coating, a CMAS-resistant layer, or the like) to substrate 106. Bond coat 108 includes at least silicon (e.g., elemental silicon) or a silicon alloy. In some examples, the presence of silicon in bond coat 108 may promote adherence between bond coat 108 and substrate 106, such as, when substrate 106 includes silicon or a compound containing silicon, such as silicon carbide. Suitable silicon alloy materials may include, for example, an iron-silicon alloy, an aluminum-silicon alloy, a molybdenum-silicon alloy, a niobium-silicon alloy, a chromium-silicon alloy, a tantalum-silicon alloy, a titanium-silicon alloy, a tungsten-silicon alloy, a zirconium-silicon alloy, or the like. As used herein, a "silicon alloy" is used to refer to a mixture of silicon and at least one other metal that results in a single-phase material as opposed to silicon plus an additive, as described further below, that results in the formation of at least two different phases.

By depositing bond coat 108 on substrate 106 using the suspension thermal spray techniques described herein, the resultant bond coat 108 may have a substantially dense microstructure compared to silicon-based bond coats formed using other deposition techniques such as a traditional thermal spray technique. For example, using traditional thermal spray techniques (e.g., non-suspension based spray deposition) may utilize a coating material with an average particle size of about 30-60 μm to avoid agglomeration or fouling of the thermal spray device. In contrast, the suspension thermal spray techniques described herein may allow use of a coating material 118 having an average particle size of less than about 25 μm, or less than about 10 μm. The reduced particle size of coating material 118 may enable a more compressed arrangement of the deposited particles, which may result in reduced porosity, reduced average pore size, higher overall density, or a combination thereof. The reduced particle size may also promote increased melting of coating material 118 during the thermal spray technique compared to traditional thermal spray techniques performed at comparable temperatures. The increased melting of coating material 118 may help increase the packing density of bond coat 108, lower the overall porosity, reduced the average pore size, or a combination thereof.

In some examples, the relatively high density of bond coat 108 may help reduce or substantially prevent exposure of substrate 106 to deleterious environmental species, prevent deterioration of bond coat 108, increase the service life of substrate 106, or the like. In some examples, the dense microstructure of bond coat 108 may be characterized in terms of the resultant volume porosity of bond coat 108. For example, the suspension thermal spray techniques described herein may reduce the amount of pores (e.g., voided space)

formed in the deposited coating 108, thereby increasing the resultant density of bond coat 108. In some examples, bond coat 108 may have a porosity of less than about 3 percent by volume (vol. %), such as less than about 2 vol. %, or less than about 1 vol. %. The porosity of deposited bond coat 108 may be measured as a percentage of pore volume divided by total volume occupied by bond coat 108 and may be measured using optical microscopy or mercury porosimetry. In some examples, the porosity of bond coat 108 may be measured using ASTM B328-94. In contrast to the suspension thermal spray techniques described herein, traditional thermal spray techniques (e.g., non-suspension based spray deposition) may produce a coating with a porosity of about 6 vol. % or more resulting in a comparatively lower density bond coat.

The relatively low-level porosity of bond coat 108 may reduce the migration of deleterious materials traveling through bond coat 108 in both directions that may otherwise damage or degrade substrate 106 or the layers formed on bond coat 108. In some examples, the relatively low porosity may also provide improved oxidation resistance.

The suspension thermal spray techniques described herein may also help reduce the resultant size of the pores produced within bond coat 108. For example, due to the particle size associated with traditional thermal spray techniques (e.g., particle diameters on the order of about 30-60 μm), the resultant pores produced between the deposited particles will remain relatively large due to the geometric size and shape of the deposited particles. Because the suspension thermal spray techniques described herein can be used to deposit relatively small size particles (e.g., particle diameters less than about 25 μm, or less than about 10 μm), the pores produced between the melt deposited particles may likewise be reduced in size. The reduced pore size may result in bond coat 108 including fewer pores connected to the surface of substrate 106 and/or reduce the amount of pores interconnected within bond coat 108. In some examples, the reduced pore size may decrease the exposure of substrate 106 to gaseous species such as oxygen and/or water vapor and may improve the oxidation resistance of bond coat 108.

Further, the small particle size of coating material 118 may allow coating material 118 to pack into smaller surface features of substrate 106 than the larger coating material particles of traditional thermal spray techniques. This may help prevent surface features and/or surface roughness on the surface of substrate 106 from being transmitted (e.g., be reproduced) in bond coat 108, or other subsequent coatings on bond coat 108. In some examples, a thermally grown oxide (TGO) layer may form on bond coat 108. The decreased surface roughness of bond coat 108 may have a more consistent thermally grown oxide than some thermally grown oxide layers formed on rougher coatings. In turn, the more consistent thermally grown oxide may reduce stress on the thermally grown oxide layer in comparison to less consistent thermally grown oxide layers.

Additionally, or alternatively, the suspension thermal spray techniques described herein may reduce the overall production cost and time expended forming bond coat 108. For example, in contrast to the suspension thermal spray techniques described herein, traditional thermal spray techniques may benefit from the surface of the substrate having a relatively high degree of surface roughness in order for a bond coat to adequately adhere to the substrate. To create the high degree of surface roughness, the surface of the substrate may be mechanically altered (e.g., grit blasted, sanded, or the like). However, mechanically altering the surface of the substrate including a ceramic or a CMC may lead to adverse effects, such as, for example, environmental degradation of the substrate material or physical damage to the reinforcement material in a CMC component. Further, the high degree of surface roughness on the surface of the substrate may be transposed (e.g., be geographically reproduced) in the bond coat, or other subsequent coatings applied on the surface of the substrate, which may reduce aerodynamic performance of the coated articles.

The suspension thermal spray techniques described herein may allow bond coat 108 to be applied substrate 106 without the need for an initial surface preparation, or with minimal surface preparation (e.g., roughening), while still obtaining sufficient adhesion to substrate 106. In some such examples, the final surface roughness of substrate 106 may be less than about 50 microinch (e.g., about 1.27 μm) Ra or between about 30 microinch Ra (e.g., about 0.76 μm) to about 50 microinch Ra (e.g., about 1.27 μm). In some such examples, by limiting the need for an initial surface preparation of substrate 106, the service life of substrate 106 may be increased and the time and cost associated with applying bond coat 108 may be reduced.

In some examples, bond coat 108 may include silicon or a silicon alloy plus one or more additional additives. The additives to the silicon or silicon alloy may result in formation of two or more distinct phases within bond coat 108 (e.g., a phase including the silicon or silicon alloy and a phase including the additive). The presence of more than one phase may help enhance the creep strength of bond coat 108 compared to a single-phase bond coat, which may increase the durability and useful life of bond coat 108. In some examples, the first or primary phase may include silicon or silicon alloy. Depending on the composition of bond coat 108, the additive (e.g., a transition metal carbide, a transition metal nitride, or an oxide) may result in a second phase dispersed within the first phase. For example, the first phase including silicon or silicon alloy may be substantially continuous throughout bond coat 108 (e.g., the first phase material remains inter-connected throughout bond coat 108) with discrete second phase regions of the additive included within the substantially continuous primary phase.

Additionally, or alternatively, the one or more optional additives may be added to bond coat 108 to modify one or more desired properties of bond coat 108. For example, the additive components may modify the coefficient of thermal expansion of bond coat 108 to increase adhesion of bond coat 108 to substrate 106 or to a layer on bond coat 108, may increase the thermal stability of bond coat 108 so that the coating can withstand higher temperatures (e.g., temperature greater than about 1350° C.), may increase the chemical stability of bond coat 108, may increase the mechanical durability of bond coat 108, or the like.

Example materials that may be added to silicon or silicon alloy of bond coat 108 may include, for example, an oxide, a carbide, a nitride, or a silicate. The one or more optional additives may be substantially non-reactive with the other coating materials (e.g., silicon or silicon alloy), the carrier, a subsequent layer deposited on bond coat 108, and/or substrate 106. In some examples, the one or more optional additives may include an oxide such as, for example, $SiO_2$, $Al_2O_3$, $ZrO_2$, $HfO_2$, a rare earth oxide ($RE_2O_3$, where RE is a rare earth element: La, Pr, Nd, Pm, Sm, Eu, Gd, Tb, Dy, Ho, Er, Tm, Yb, Lu, Y, or Sc), titanium oxide ($TiO_2$), tantalum oxide ($Ta_2O_5$), an alkali metal oxide ($Li_2O$, $Na_2O$, $K_2O$, $Rb_2O$, $Cs_2O$, or $Fr_2O$), or an alkaline earth metal oxide (BeO, MgO, CaO, SrO, BaO, or RaO). Additionally, or alternatively, the one or more additives may include a transition metal carbide or a transition metal nitride. Suitable transition metals may include, for example, Cr, Mo, Nb, W, Ti, Ta, Hf, or Zr, to form carbides such as $Cr_3C_2$, $Cr_7C_3$, $Cr_{23}C_6$, $Mo_2C$, NbC, WC, TaC, HfC, or ZrC, or nitrides such as TiN, ZrN, HfN, $Mo_2N$, or TaN. In some examples, the additive may include a silicate such as $ZrSiO_4$, $HfSiO_4$, a rare earth silicate (e.g., monosilicate, disilicate, or combination thereof), where a rare earth element may be La, Pr, Nd, Pm, Sm, Eu, Gd, Tb, Dy, Ho, Er, Tm, Yb, Lu, Y, or Sc, or the like.

In some examples, bond coat 108 may include predominately (e.g., the main component) silicon or silicon alloy (e.g., about 50 weight percent (wt. %) to about 100 wt. %) and a balance of the additive, with a total of 100 wt. %. In examples in which bond coat 108 includes one or more optional additives, bond coat 108 may include two or more discrete phases with the primary phase including silicon or silicon alloy. In such examples, the primary phase may account for at least about 50 vol. % of bond coat 108.

Bond coat 108 may define any thickness adequate to promote adherence of an additional layer to substrate 106, provide protection to substrate 106, or both. For example, bond coat 108 may have a thickness of less than about 200 µm. In some examples, bond coat 108 may include a thickness of up to about 50 µm, up to about 25 µm, or between about 1 µm and about 25 µm.

System 100 may be used to apply bond coat 108 to substrate 106 using a suspension thermal spray technique. Chamber 102 may substantially enclose (e.g., enclose or nearly enclose) stage 104 that receives substrate 106, and thermal spray device 110. In some examples, stage 104 may be configured to selectively position and restrain substrate 106 in place relative to thermal spray device 110 during formation of bond coat 108. For example, stage 104 may be translatable and/or rotatable along at least one axis to position substrate 106 relative to thermal spray device 110 to facilitate the application of bond coat 108 onto one or more surfaces of substrate 104 via thermal spray device 110.

System 100 also includes suspension source 112 configured to deliver a suspension 116 including a coating material 118 (e.g., the solid materials that forms bond coat 108) and a carrier 120 to thermal spray device 110 or a plume generated by thermal spray device 110. In some examples, suspension source 112 may include a nozzle or other apparatus within chamber 102 for introducing suspension 116 to thermal spray device 110 or a plume generated by thermal spray device 110. Suspension source 112 may be communicatively coupled to computing device 114, such that computing device 114 may control suspension source 112 (e.g., opening or closing a valve, positioning suspension source 112, controlling a flow rate of suspension 116 from suspension source 112 to thermal spray device 110, or the like).

Coating material 118 may include particles of the materials used to form bond coat 108. For example, coating material 118 includes at least silicon (e.g., elemental silicon) or a silicon alloy, and one or more optional additives (e.g., oxides, carbides, nitrides, or silicates) described above in the form of a fine particles to facilitate softening or vaporization of coating material 118 by a heated plume created by thermal spray device 110. Coating material 118 may have an average particle diameter between about 0.01 µm and about 25 µm, between about 1 µm and about 25 µm, between about 1 µm and about 10 µm, or between about 0.01 µm and about 5 µm. As described above, the relatively small particle diameter sizes (e.g., compared particle diameters needed for traditional thermal spray techniques) may allow for deposited bond coat 108 to exhibit a decreased overall porosity and resultant higher density.

In some examples, coating material 118 may include a single particle type, e.g., silicon or a pre-alloyed silicon particle. The single particle type may allow for a uniform disbursement and control of the composition of the resultant bond coat 108. In other examples, coating material 118 may include more than one particle type, e.g., distinct particles of silicon and distinct particles of the one or more additives combined to make up bond coat 108. The particle materials may be premixed within suspension 116 prior to deposition. Due to the relatively small particle size, the suspension thermal spray techniques may allow for the distinct phases, associated with the different particle supply materials to remain within bond coat 108 at exceedingly small grain sizes.

Suspension 116 also includes carrier 120 that acts as a carrier fluid and allows small particles (e.g., less than about 25 µm, or less than about 10 µm) of coating material 118 to be used without the need for agglomeration of the particles prior to deposition. In some examples, carrier 120 may be a water-based or alcohol-based solvent. Examples of suitable materials for carrier 120 may include, for example, water, ethanol, methanol, isopropyl alcohol, butanol, glycol, or the like. In some examples, carrier 120 may be referred to as a liquid carrier or a carrier fluid.

Coating material 118 may be added to carrier 120 to form suspension 116. In some examples, suspension 116 may include about 1 vol. % to about 30 vol. % solid loading of coating material 118 in carrier 120. In examples in which coating material 118 includes a silicon alloy, coating material 118 may be added to carrier 120 to form suspension 116 that includes nitrates, hydrates, or acetates of the alloy element. The nitrates, hydrates, and/or acetates may dissolve in suspension 116, which may result in ions of the alloy element diffusing into coating material 118 during the suspension thermal spray process described herein.

In some examples, suspension 116 may further include one or more delivery aids (e.g., additives that do not form bond coat 108 but aid in the delivery or deposition of coating material 118 within carrier 120). Examples of delivery aids may include one or more dispersants.

Thermal spray device 110 may include a plasma spray device, a high-velocity oxy-fuel (HVOF) spray device, or other suitable thermal spray device for depositing coating material 118 dispersed within carrier 120. In examples where thermal spray device 110 is a plasma spray device, thermal spray device 110 may include a plasma spray gun including a cathode and an anode separated by a plasma gas channel. As the plasma gas flows through the plasma gas channel, a voltage may be applied between the cathode and anode to cause the plasma gas to form a plasma. In some such examples, suspension 116 may be injected inside thermal spray device 110 such that the suspension flows through part of the plasma gas channel. In other examples, suspension 116 may be introduced to a plume of the plasma external to thermal spray device 110. Upon introduction to the plasma gas, carrier 120 in suspension 116 may evaporate allowing coating material 118 to be heat softened or vaporized followed by the subsequent deposition of coating material 118 on the surface of substrate 106 in the form of bond coat 108.

In examples in which thermal spray device 110 includes a HVOF spray device, thermal spray device 110 may include a combustion chamber or nozzle. In examples including a combustion chamber, the combustion chamber may be a high-pressure combustion chamber. Oxygen and fuel, such as, kerosene, acetylene, propylene, hydrogen, or the like, may be fed to the high-pressure combustion chamber. Combustion of the fuel may create a hot, high pressure flame. The flame may be forced down a nozzle of thermal spray device 110, which may result in the velocity of the flame increasing. Suspension 116 may then be fed into the high-velocity flame via suspension source 112. Upon interaction with the high-pressure flame, carrier 120 may evaporate allowing coating material 118 to be heat softened or vaporized by the flame and subsequently deposited on the surface of substrate 106 in the form of bond coat 108.

In examples including a combustion nozzle, oxygen and a fuel gas, such as, for example, propane, propylene, hydrogen, or the like, may be supplied to the combustion nozzle at a high pressure. Thermal spray device 110 may include an air cap in addition to the combustion nozzle. As the oxygen and fuel gas flow into the air cap, combustion may occur and create a flame. The air cap may be supplied with compressed air, and the compressed air may accelerate the flame. Suspension 116 may then be fed into the high-velocity flame, where carrier 120 is evaporated allowing coating material 118 to be heat softened or vaporized by the flame and subsequently deposited on the surface of substrate 106 in the form of bond coat 108.

System 100 also includes computing device 114. Computing device 114 may include, for example, a desktop computer, a laptop computer, a workstation, a server, a mainframe, a cloud computing system, or the like. Computing device 114 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 114 may be provided within dedicated hardware and/or software modules.

Computing device 114 may be configured to control operation of system 100, including, for example, stage 104, suspension source 112, and/or thermal spray device 110. For example, computing device 114 may be configured to control operation of stage 104, suspension source 112, and/or thermal spray device 110 to position substrate 106 relative to suspension source 112 and/or thermal spray device 110. In such examples, computing device 114 may control suspension source 112 and thermal spray device 110 to maneuver the position of substrate 106 relative to thermal spray device 110 to facilitate the deposition of bond coat 108.

Computing device 114 may be communicatively coupled to at least one of stage 104, suspension source 112, and thermal spray device 110 using respective communication connections. Such connections may be wireless or wired connections and may include one or more intermediary devices such a servo motor.

Figure 2:
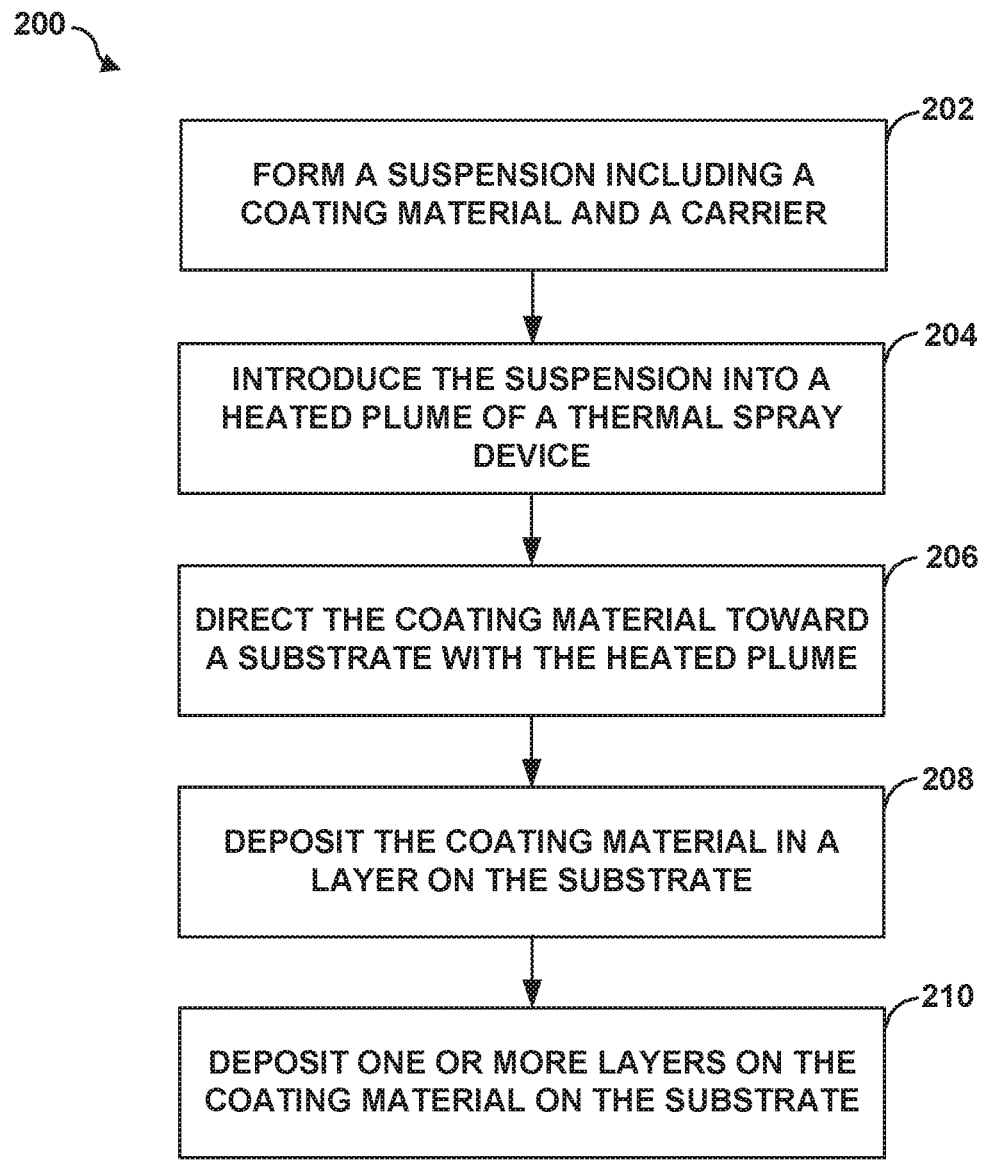
FIG. 2 is a flow diagram illustrating an example technique for forming a bond coat including silicon or silicon alloy using a suspension thermal spray technique.

FIG. 2 is a flow diagram illustrating an example technique 200 for forming a bond coat using a suspension thermal spray technique as described herein. The technique of FIG. 2 will be described with respect to system 100 and article 130 of FIG. 1 for ease of description only. A person having ordinary skill in the art will recognize and appreciate that the technique of FIG. 2 may be performed using other suspension thermal spray systems and that article 130 of FIG. 1 may be formed using suspension thermal spray techniques other than those described in FIG. 2.

The technique of FIG. 2 includes forming suspension 116 including coating material 118 and carrier 120 (202). Coating material 118 and carrier 120 may be substantially the same as the coating material 118 and carrier 120 described above with respect to system 100 of FIG. 1. For example, coating material 118 may include silicon or a silicon alloy, and optionally may include one or more additives.

Coating material 118 may be fine particles to facilitate melt softening or vaporization of the coating material by a heated plume (e.g., flame or plasma) of thermal spray device 110. The fine particles making up coating material 118 may have an average particle diameter between about 0.01 µm and about 25 µm, between about 0.01 µm and about 10 µm, between about 0.01 µm and about 5 µm, or between about 0.01 µm and about 1 µm. The relatively small particle sizes of coating material 118 may result in bond coat 108 having a reduced porosity (e.g., less than 3 vol. %) compared to a bond coat deposited using a traditional thermal spray technique. In some examples, coating material 118 may include a single particle supply material, e.g., silicon or pre-alloyed silicon particles, while in other examples, coating material 118 may include more than one particle supply materials, e.g., discrete particles of silicon, discrete particles of the one or more addition components used to form the silicon alloy, discrete particles of the optional additive, and combinations thereof.

Coating material 118 may be added to carrier 120 to form suspension 116 that includes about 1 vol. % to about 30 vol. % solid materials (e.g., coating material 118) in carrier 120. In examples in which coating material 118 includes a silicon alloy, coating material 118 may be added to carrier 120 to form suspension 116 that includes nitrates, hydrates, or acetates of the alloy material. Suspension 116 may further include delivery aids such as a dispersant or surfactant. The dispersant or surfactant may prevent coating material 118 and/or an optional additive from agglomerating in carrier 120.

The technique of FIG. 2 also includes introducing suspension 120 into a heated plume formed by thermal spray device 110 (204). Thermal spray device 110 may be a plasma spray device or a HVOF device. In some examples, computing device 114 may control suspension source 112 to provide a controlled amount or rate of suspension 116 into the heated plume formed by thermal spray device 110. In examples in which thermal spray device 110 is a plasma spray device, the plasma may be the heated plume. In examples in which thermal spray device 110 is a HVOF device, the high-velocity flame may be the heated plume.

Suspension 116 may be stored or supplied to thermal spray device 110 using suspension source 112. Computing device 114 may control suspension source 112 to introduce a controlled amount of suspension 116 into the heated plume formed by thermal spray device 110.

The temperature of the heated plume may, in some examples, be above about 6000 K, which may result in evaporation of substantially all (e.g., all or nearly all) of carrier 120 or other delivery aids. The evaporation of carrier 120 may leave substantially only coating material 118 in the heated plume. The high temperature of the heated plume may also result in melt softening, partial vaporization, or vaporization of coating material 118.

Technique 200 further includes directing coating material 118 toward substrate 106 using the heated plume (206). For example, computing device 114 may control a position of thermal spray device 110, stage 104, or both, to cause the heated plume to be directed at a selected location of substrate 106 to result in coating material 118 being deposited at the selected location. The heated plume may carry coating material 118 toward substrate 106, where coating material 118 deposits in a layer on substrate 106 (208). The layer deposited on substrate 106 forms bond coat 108. Because coating material 118 is carried by the heated plume toward substrate 106, this technique may provide some non-line-of-sight capability, depositing coating material 118 on surfaces that are not in direct line-of-sight with thermal spray device 110 due to the movement of the heated plume. This may facilitate forming bond coat 108 on a substrate 106 that includes a more complex geometry (e.g., non-planar geometry).

The fine particles of coating material 118 (e.g., less than about 25 μm, or less than about 10 μm) utilized in the suspension thermal spraying techniques described herein may result in bond coat 108 deposited on substrate 106 having a substantially dense microstructure. The fine particles of coating material 118 may allow for closer packing of the particles, which may result in a denser bond coat 108 than some coatings formed using larger particles or other deposition techniques. A dense bond coat 108 may help prevent exposure of the surface of substrate 106 to environmental species, prevent deterioration of bond coat 108, and increase the service life of substrate 106. The relatively dense microstructure of bond coat 108 may be characterized in terms of its porosity. In some examples, bond coat 108 may have an average porosity of less than about 3 vol. %, such as less than about 2 vol. %, or less than about 1 vol. %, where porosity is measured as a percentage of pore volume divided by total volume of bond coat 108 as measured using optical microscopy or mercury porosimetry.

The relatively small diameter of the particles of coating material 118 may also allow deposition of bond coat 108 on a surface of substrate 106 that has not been mechanically altered to create a high-degree of surface roughness prior to applying bond coat 108. Therefore, technique 200 may allow bond coat 108 to be applied to substrate 106 without an initial surface preparation, or with minimal surface preparation, while still obtaining sufficient adhesion to substrate 106. In some such examples, by eliminating or reducing the need for the initial surface preparation of substrate 106, the service life of substrate 106 may be increased and the time and cost associated with applying bond coat 108 may be reduced. In some examples, the technique 200 may exclude an initial surface preparation step (e.g., grit blasting) that roughens the surface of substrate 106 prior to forming bond coat 106 directly on the surface of substrate 106.

In some examples, bond coat 108 on substrate 106 may be deposited to exhibit a first degree of surface roughness. Further, regardless of whether the surface of substrate 106 is mechanically altered or not, the surface of substrate 106 may have a second degree of surface roughness (e.g., between about 0.76 μm Ra and about 1.27 μm Ra). The technique of FIG. 2 may result in the first degree of surface roughness being less (e.g., smoother) than the second degree of surface roughness due to the fine particles of coating material 118 providing a smoothing effect during deposition. In some examples, the fine particles of coating material 118 may allow for the particles to fill undulations in the surface of substrate 106, which may result in bond coat 108 with less surface roughness than some coatings formed using larger particles.

Various parameters of the suspension thermal spray system 100 may be controlled to yield desired properties of bond coat 108. For example, the size of the particles of coating material 118, the spraying distance, power of thermal spray device 110, injection position, size of injection nozzle, surface speed, advance rate, target temperature, or carrier 120 may affect the microstructure, thickness, phase(s), and porosity of bond coat 108. For example, larger particles, a higher spray velocity, or a lower plume temperature may increase porosity of bond coat 108, while smaller particles, a lower spray velocity, or a higher plume temperature may reduce porosity of bond coat 108. In some examples, the viscosity and/or the solid loading of coating material 118 in carrier 120 may also affect the microstructure of bond coat 108.

In some examples, system 100 may include an inert gas source (not shown in FIG. 1), and the inert gas source may supply an inert gas shroud to coating material 118 in the heated plume during deposition of coating material 118 on substrate 106. The inert gas may surround the heated plume as it exits thermal spray device 110. The inert gas shroud may reduce in-air oxidation of coating material 118. In-air oxidation may cause the resulting bond coat 108 to have reduced density, cohesive strength, bond strength, or the like. The inert gas used for the inert gas shroud may be Ar, $N_2$, or the like.

In some examples, while directing the coating material toward substrate 106 using the heated plume (206), computing device 114 may control thermal spray device 110, stage 104, or both to move thermal spray device 110 and substrate 106 relative to each other. For example, computing device 114 may be configured to control thermal spray device 110 to scan the heated plume along a surface of substrate 106. This may cause the heated plume that includes coating material 118 to move relative to the surface of substrate 106 and may form bond coat 108 over the surfaces of substrate 106 scanned with the heated plume.

Technique 200 also includes depositing one or more additional layers on bond coat 108 (210). The one or more additional layers may include protective or functional layers, such as, for example, an EBC layer, a TBC layer, an abradable coating, an additional bond coat, a flash bond coat, a CMAS-resistant layer, or the like. In some examples, the one or more additional layers may be applied using a suspension thermal spray technique, e.g., technique 200 from FIG. 2 and/or system 100 of FIG. 1. In other examples, the one or more additional layers may be applied using other techniques including, for example, traditional thermal spraying, including, air plasma spraying; high velocity oxy-fuel (HVOF) spraying; low vapor plasma spraying; physical vapor deposition (PVD) including electron beam-PVD (EB-PVD), directed vapor deposition (DVD), and cathodic arc deposition; chemical vapor deposition (CVD); slurry process deposition; sol-gel process deposition; electrophoretic deposition; or the like.

Figure 3:
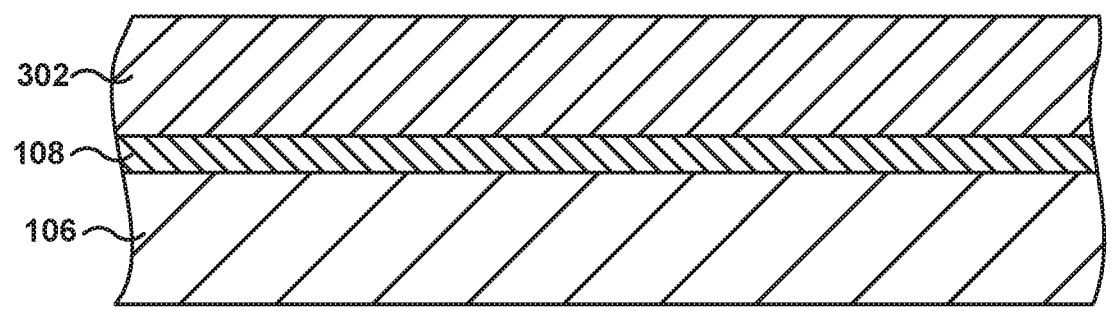
FIG. 3 is a cross-sectional diagram illustrating an example article including a substrate that includes a ceramic or a CMC, a bond coat that includes silicon or a silicon alloy deposited on the substrate using a suspension thermal spray technique, and at least one additional layer on the bond coat.

FIG. 3 is conceptual cross-sectional diagram illustrating an example article 300 including a substrate 106 that includes a ceramic or a CMC, silicon-based bond coat 108 deposited using the suspension thermal spray techniques described herein, and at least one additional layer 302 on bond coat 108. Bond coat 108 may be directly on substrate 106 and include a composition that provides adherence between substrate 106 and additional layer 302 on bond coat 108. In some examples, the adherence provided by bond coat 108 between substrate 106 and additional layer 302 may be greater than the adherence otherwise produced between substrate 106 and additional layer 302 (e.g., an EBC), without the presence of bond coat 108.

Bond coat 108 may be the same or substantially the same as bond coat 108 from FIG. 1. As described above, bond coat 108 may be deposited on substrate 106 using the suspension thermal spray techniques described herein. Bond coat 108 of article 300 may include silicon or a silicon alloy and, optionally, one or more additives. In some examples, bond coat 108 may have a relatively low porosity (e.g., less than 3 vol. %) as a result of the suspension thermal spray technique, e.g. technique 200 from FIG. 2.

In some examples, the at least one additional layer 302 deposited on bond coat 108 may include an EBC layer. The EBC layer may reduce or substantially prevent attack by chemical species present in the environment in which article 300 is utilized, e.g., in the intake gas or exhaust gas of a gas turbine engine, against bond coat 108, substrate 106, or both. For example, the EBC layer may include a material that is resistant to oxidation or water vapor attack. Example materials for use in the EBC layer may include mullite; glass ceramics such as barium strontium aluminosilicate (BaO—SrO—$Al_2O_3$-$2SiO_2$; BSAS), calcium aluminosilicate ($CaAl_2Si_2O_8$; CAS), cordierite (magnesium aluminosilicate), and lithium aluminosilicate; and rare earth silicates (silicates of Lu, Yb, Tm, Er, Ho, Dy, Tb, Gd, Eu, Sm, Pm, Nd, Pr, Ce, La, Y, or Sc). The rare earth silicate may be a rare earth mono-silicate ($RE_2SiO_5$, where RE stands for "rare earth"), a rare earth di-silicate ($RE_2Si_2O_7$, where RE stands for "rare earth"), or a combination of both. In some examples, the EBC layer may be a substantially non-porous layer, while in other examples, the EBC layer is a layer that includes a plurality of cracks. The EBC layer may be formed using, for example, suspension thermal spraying including suspension plasma spraying or suspension HVOF spraying; CVD; PVD including EB-PVD and DVD; plasma spraying or another thermal spraying process, or the like. In some examples, the EBC layer may have a thickness between about 25.4 µm and 2540 µm. In other examples, the EBC layer may have a thickness between about 76.2 µm and about 1270 µm.

In some examples, the at least one additional layer 302 may include a TBC layer on bond coat 108. The TBC layer includes a thermally insulative material that may allow for article 300 to remain stable at temperatures above 1350° C. and/or above about 1410° C. (e.g., maximum working temperature for substrate 106). The TBC layer may be a porous layer or a columnar layer, and may be formed using, for example, suspension thermal spraying including suspension plasma spraying or suspension HVOF spraying; CVD; PVD including EB-PVD and DVD; plasma spraying or another thermal spraying process, or the like. In this way, the TBC layer may allow use of article 300 within higher temperature environments without causing substrate 106 to reach its maximum temperature threshold.

Example TBC materials may include ceramic layers comprising $ZrO_2$ or $HfO_2$. A TBC layer that includes $ZrO_2$ or $HfO_2$ optionally may include one or more other elements or compounds to modify a desired characteristic of the TBC layer, such as, for example, phase stability, thermal conductivity, or the like. Example additive elements or compounds may include one or more rare earth oxides (oxides of Lu, Yb, Tm, Er, Ho, Dy, Tb, Gd, Eu, Sm, Pm, Nd, Pr, Ce, La, Y, or Sc). Particular examples of materials from which the TBC layer may be formed include $ZrO_2$ stabilized with between 7 weight percent (wt. %) and 8 wt. % $Y_2O_3$; $ZrO_2$ stabilized with $Yb_2O_3$, $Sm_2O_3$, and at least one of $Lu_2O_3$, $Sc_2O_3$, $Ce_2O_3$, $Gd_2O_3$, $Nd_2O_3$, or $Eu_2O_3$; or $HfO_2$ stabilized with $Yb_2O_3$, $Sm_2O_3$, and at least one of $Lu_2O_3$, $Sc_2O_3$, $Ce_2O_3$, $Gd_2O_3$, $Nd_2O_3$, or $Eu_2O_3$.

In some examples, the TBC layer may include $ZrO_2$ and/or $HfO_2$ in combination with additive elements or compounds such that at least some of the stabilized $ZrO_2$ and/or $HfO_2$ forms a metastable tetragonal-prime crystalline phase, a cubic crystalline phase, or a compound phase ($RE_2Zr_2O_7$ or $RE_2Hf_2O_7$, where RE is a rare earth element). In some examples, the TBC layer may have a thickness between about 25.4 µm and 2540 µm, or the TBC layer may have a thickness between about 76.2 µm and about 1270 µm.

In some examples, the at least one additional layer 302 may include a CMAS-resistant layer on bond coat 108. The CMAS-resistant layer includes an element or compound that reacts with CMAS to form a solid or a highly-viscous reaction product (e.g., a reaction product that is a solid or highly viscous at the temperatures experienced by article 300). In some examples, the CMAS-resistant layer includes $Al_2O_3$ and at least one rare earth oxide, such as, for example, an oxide of at least one of Sc, Y, La, Ce, Pr, Nd, Pm, Sm, Eu, Gd, Tb, Dy, Ho, Er, Tm, Yb, and Lu. The combination of $Al_2O_3$ and at least one rare earth oxide may allow for tailoring of one or more properties of the CMAS-resistant layer such as, for example, the chemical reactivity of the CMAS-resistant layer with CMAS, the viscosity of the reaction products, the coefficient of thermal expansion (CTE) of the CMAS-resistant layer, the chemical compatibility of the CMAS-resistant layer with bond coat 108, or the like.

In some examples, the CMAS-resistant layer is essentially free of $ZrO_2$ and/or $HfO_2$. That is, in these examples, the CMAS-resistant layer includes at most trace amounts of $ZrO_2$ and/or $HfO_2$, such as, for example, the amounts present in commercially-available rare earth oxides.

In some examples, the CMAS-resistant layer includes $SiO_2$ in addition to the $Al_2O_3$ and at least one rare earth oxide to form one or more discrete phase regions of the $SiO_2$, $Al_2O_3$, and the rare earth oxide. $SiO_2$ can be added to the CMAS-resistant layer to allow further manipulation of the properties of the CMAS-resistant layer such as, for example, the chemical reactivity, the viscosity of the reaction products, the CTE, the chemical compatibility of the CMAS-resistant layer with bond coat 108, or the like.

In some examples, the CMAS-resistant layer optionally includes other additive components such as, for example, $TiO_2$, $Ta_2O_5$, $HfSiO_4$, alkali metal oxides, alkaline earth metal oxides, or mixtures thereof. The additive components may be added to the CMAS-resistant layer to modify one or more desired properties of the CMAS-resistant layer. For example, the additive components may increase or decrease the reaction rate of the CMAS-resistant layer with CMAS, may modify the viscosity of the reaction product from the reaction of CMAS and the CMAS-resistant layer, may increase adhesion of the CMAS-resistant layer to bond coat 108, may increase or decrease the chemical stability of the CMAS-resistant layer, or the like.

In some examples, the CMAS-resistant layer may include up to about 99 mol. % of the at least one rare earth oxide, ±1 mol. %, and up to about 90 mol. % of $Al_2O_3$, with a total of 100 mol. %. In some examples, the CMAS-resistant layer may also include up to about 90 mol. % of $SiO_2$. In other examples, the CMAS-resistant layer may additionally include up to about 50 mol. % of at least one of $TiO_2$, $Ta_2O_5$, $HfSiO_4$, an alkali oxide, or an alkaline earth oxide.

In some examples, the CMAS-resistant layer may include between about 20 mol. % and about 80 mol. % of at least one rare earth oxide, between about 5 mol. % and about 50 mol. % $Al_2O_3$, and, optionally (e.g., when added), between about 5 mol. % to about 50 mol. % of $SiO_2$. In other examples, the CMAS-resistant layer may additionally include between about 0.1 mol. % and about 30 mol. % of at least one of $TiO_2$, $Ta_2O_5$, $HfSiO_4$, an alkali oxide, or an alkaline earth oxide when added.

As described above, the CMAS-resistant layer reacts with CMAS that reaches it to form a solid or highly viscous reaction product. The reaction product may have a melting temperature significantly higher than CMAS (e.g., higher than about 1200-1250° C.). A solid or highly viscous reaction product is desired because the CMAS-resistant layer is consumed as it reacts with CMAS. If, for example, the reaction product of the CMAS-resistant layer and CMAS was a relatively low viscosity liquid, the low viscosity liquid would contact bond coat 108 and/or substrate 106 once the CMAS-resistant layer is consumed by the reaction, which is the very occurrence the CMAS-resistant layer is designed to prevent.

If the reaction product is a solid or highly viscous, however, a reaction layer will form on the surface of the CMAS-resistant layer, which will lower the reaction rate of the CMAS with the CMAS-resistant layer. That is, once a solid or highly viscous reaction layer forms on the surface of the CMAS-resistant layer, the reaction between the CMAS-resistant layer and CMAS will slow, because any further reaction will require the diffusion of CMAS through the reaction layer to encounter the CMAS-resistant layer, or diffusion of a component of the CMAS-resistant layer through the reaction layer to encounter the CMAS. In either case, the diffusion of either CMAS or the component of the CMAS-resistant layer is expected to be the limiting step in the reaction once a solid or highly viscous reaction layer is formed on the surface of the CMAS-resistant layer, because diffusion will be the slowest process.

The CMAS-resistant layer may be formed using, for example, suspension thermal spraying including suspension plasma spraying or suspension HVOF spraying; CVD; PVD including EB-PVD and DVD; plasma spraying or another thermal spraying process, or the like. In some examples, the CMAS-resistant layer may have a thickness between about 25.4 μm and 2540 μm. In other examples, the CMAS-resistant layer may have a thickness between about 76.2 μm and about 1270 μm.

In some examples, the at least one additional layer 302 may include an abradable coating on bond coat 108. An abradable coating may be used on surfaces of a high-temperature mechanical components such as, for example, a blade track of a gas turbine engine to reduce leakage and improve engine efficiency. The abradable coating can include aluminum nitride, aluminum diboride, boron carbide, aluminum oxide, mullite, zirconium oxide, carbon, silicon carbide, silicon nitride, transition metal nitrides, transition metal borides, rare earth (RE) oxides, and mixtures and combinations thereof. In some examples, the abradable coating includes at least one silicate, which refers to a synthetic or naturally-occurring compound including silicon and oxygen. Suitable silicates include, but are not limited to, rare earth (RE) disilicates, RE monosilicates, barium strontium aluminum silicate, and mixtures and combinations thereof.

In some examples, the abradable coating may include a base oxide and at least three rare earth oxides. The base oxide may be zirconia or hafnia. The at least three rare earth oxides may include a primary rare earth oxide, a secondary rare earth oxide, and a tertiary rare earth oxide. The primary rare earth oxide may include ytterbia, the secondary rare earth oxide may include samaria, and the tertiary rare earth oxide may include at least one of lutetia, scandia, ceria, gadolinia, neodymia, or europia. In some examples, the abradable coating may be essentially free of yttria. The abradable coating may be porous, defining a porosity between about 25 vol. % and about 50 vol. %.

The abradable coating may be formed using, for example, suspension thermal spraying including suspension plasma spraying or suspension HVOF spraying; CVD; PVD including EB-PVD and DVD; plasma spraying or another thermal spraying process, or the like. In some examples, the abradable coating may have a thickness between about 254 μm and about 3175 μm.

In some examples, the at least one additional layer 302 may include an additional bond coat. In some such examples, the additional bond coat may have the same or similar composition as bond coat 108 described above, or may have the same or similar composition as a layer on the additional bond coat. In some examples, the additional bond coat may be a flash bond coat applied on bond coat 108 to promote adhesion of one of an EBC layer, a TBC layer, a CMAS-resistant layer, or an abradable coating to bond coat 108. The flash bond coat may have the same or substantially the same composition as bond coat 108. In some examples, the flash bond coat may have an increased surface roughness in comparison to bond coat 108, which in turn may mechanically lock a layer on the flash bond coat (e.g., EBC layer, TBC layer, CMAS-resistant layer, or abradable coating) in place and increase adhesion of that layer to bond coat 108. The additional bond coat may provide increased adherence of bond coat 108 to a layer on bond coat 108. The additional bond coat may be formed using, for example, suspension thermal spraying including suspension plasma spraying or suspension HVOF spraying; CVD; PVD including EB-PVD and DVD; air plasma spraying or another thermal spraying process, or the like. In some examples, the additional bond coat may be formed (e.g., using traditional thermal spray techniques) to exhibit a higher porosity and/or higher degree of surface roughness compared to bond coat 108. In some such examples, the higher porosity and/or higher degree of surface roughness of the additional bond coat may increase adherence of a layer on bond coat 108.

Although the at least one additional layer 302 is described above as being an optional EBC layer, TBC layer, CMAS-resistant layer, abradable coating, or additional bond coat deposited on bond coat 108, in some examples, at least two or more of the above described layers may be on bond coat 108. For example, FIGS. 4 and 5 are cross-sectional diagrams of an example articles that include a multi-layer coating on bond coat 108 and substrate 106 using a suspension thermal spray technique to form bond coat 108.

Figure 4:
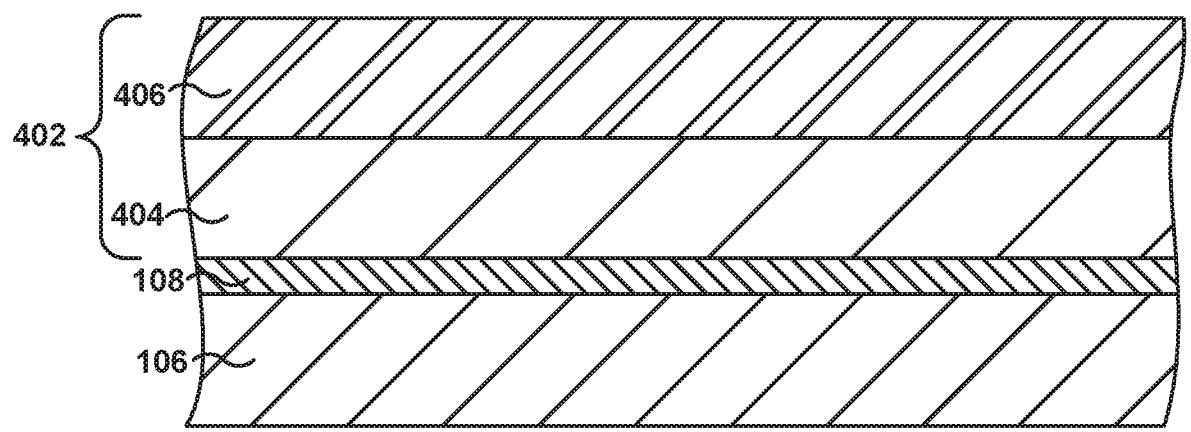
FIG. 4 is a cross-sectional diagram of an example article including a substrate that includes a ceramic or a CMC, a bond coat including silicon or silicon alloy on the substrate, and a multi-layer coating on the bond coat, the bond coat being formed using a suspension thermal spray technique.
Figure 5:
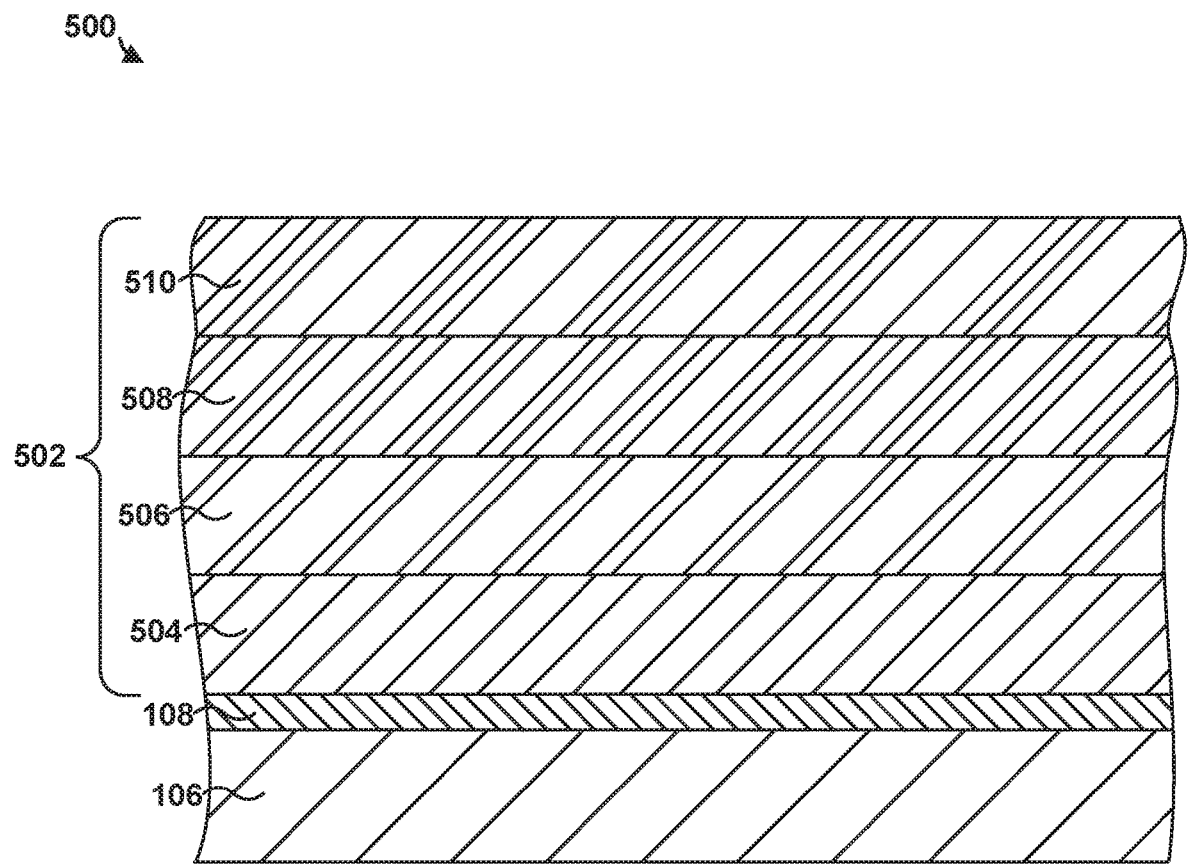
FIG. 5 is a cross-sectional diagram of another example article including a substrate that includes a ceramic or a CMC, a bond coat including silicon or silicon alloy on the substrate, and a multi-layer coating on the bond coat, the bond coat being formed using a suspension thermal spray technique.

FIG. 4 is a cross-sectional diagram of an example article 400 that includes a multi-layer coating 402 deposited on bond coat 108 and substrate 106, using a suspension thermal spray technique to form bond coat 108. Multi-layer coating 402 includes flash bond coat 404 and an additional layer 406. In some examples, additional layer 406 may be an EBC layer, an abradable coating, or both.

In some examples, flash bond coat 404 may have the same or similar composition as compared to bond coat 108 described above. In other examples, flash bond coat 404 may have the same or substantially the same composition as additional layer 406. Flash bond coat 404 may promote adhesion between bond coat 108 and additional layer 406. Flash bond coat 404 may be formed using, for example, traditional thermal spray techniques, such as plasma spraying, to exhibit a higher porosity and/or higher degree of surface roughness compared to bond coat 108. In some such examples, the higher porosity and/or higher degree of surface roughness of flash bond coat 404 may increase adherence of additional layer 406 to bond coat 108 and provide an additional layer of thermal insulation between substrate 106 and the external environment.

In the case in which additional layer 406 is an EBC layer, the EBC layer may be the same or substantially the same as the EBC layer described above with respect to FIG. 3. For example, the EBC layer may include a material that is resistant to oxidation or water vapor attack. In some examples, EBC layer 504 may be formed using the suspension thermal spray techniques as described herein to exhibit a reduced porosity or higher density. The reduced porosity and/or higher density may improve the durability and function of layer compared to a comparable EBC layer formed using traditional thermal spray techniques by reducing or substantially preventing environmental species from migrating through EBC layer 504. In other examples, the EBC layer may be formed using, for example, traditional thermal spray techniques, such as air plasma spraying. The EBC layer may reduce or substantially prevent attack by chemical species present in the environment in which article 400 is utilized, e.g., in the intake gas or exhaust gas of a gas turbine engine, against bond coat 108 and/or substrate 106.

In the case in which additional layer 406 is an abradable coating, the abradable coating may be the same or substantially the same as the abradable coating described above with respect to FIG. 3. In some examples, the abradable coating may be formed using, for example, traditional thermal spray techniques, such as air plasma spraying, to exhibit a higher porosity. In other examples, the abradable coating may be formed using, for example, a suspension thermal spray technique. One or more parameters of the suspension thermal spray technique may be adjusted to yield desired properties of the abradable coating. For example, the size of the particles used, the spraying distance, the spray velocity, target temperature, and/or the carrier used may affect the microstructure, thickness, phase(s), and/or porosity of the abradable coating. In some examples, the particle size of the coating material used in forming the abradable coating may remain relatively large. The increased particle size may increase the resultant porosity of the deposited layer. In some examples, the solid loading of the coating material in the carrier, spray distance, size of the injection nozzle may also affect the porosity of the abradable coating. Additionally, or alternatively, forming the abradable coating using a suspension thermal spray method may result in the abradable coating including a columnar microstructure. The porous and/or columnar microstructure of the abradable coating may provide improved thermal cycling resistance and/or may allow the abradable coating to be abraded on contact to create an improved seal such as, for example, by a gas turbine engine blade.

The higher porosity of the abradable coating may allow the layer to be abraded upon contact with another component such as, for example, a blade of a gas turbine engine. In this way, an improved seal surface may be formed between article 400 and the contacting component. The abradable coating and improved seal surface on some surfaces of a high-temperature mechanical component, such as, for example, a blade track of a gas turbine engine, may reduce leakage and improve operating efficiencies.

In some examples, multi-layer coating 402 may include an abradable coating on an EBC as layer 406.

FIG. 5 shows an example article 500 that includes substrate 106, bond coat 108, and multilayer coating 502 deposited on bond coat 108. Multi-layer coating 502 includes an EBC layer 504 on bond coat 108, a TBC layer 506 on EBC layer 504, a CMAS-resistant layer 508 on TBC layer 506, and an abradable coating 510 on CMAS-resistant layer 508. The composition and construction of the layers of multi-layer coating 502 may be substantially the same as described above with respect to at least one additional layer 302 of FIG. 3. The layers of multi-layer coating 502 may be in substantially the same order as shown in FIG. 5, or the layers of multi-layer coating 502 may be in an order different than that shown. In some examples, multi-layer coating 502 may include all of the layers shown in FIG. 5. In other examples, multi-layer coating 502 may have one or more of layers 502 removed or one or more additional layers included in multi-layer coating 502 of FIG. 5, depending on the intended application for article 500.

Various examples have been described. These and other examples are within the scope of the following claims.

What is claimed is:

1. A method comprising:
introducing a suspension comprising a coating material and a carrier into a heated plume of a thermal spray device, wherein the coating material comprises silicon or a silicon alloy;
directing the coating material toward a substrate using the heated plume, wherein the substrate comprises a ceramic or a ceramic matrix composite; and
depositing the coating material to form a bond coat directly on a surface of the substrate, the surface of the substrate having a first surface roughness when the coating material is deposited, wherein the bond coat comprises the silicon or the silicon alloy, wherein the bond coat defines a porosity of less than about 3 percent by volume (vol. %), and wherein an average particle size of particles in the coating composition is selected such that a surface of the bond coat formed by the deposition of the coating material exhibits a second surface roughness that is less than the first surface roughness.

2. The method of claim 1, wherein the thermal spray device comprises a plasma spray gun or a high-velocity oxy-fuel spray gun.

3. The method of claim 1, wherein the carrier comprises a water-based or an alcohol-based fluid.

4. The method of claim 1, wherein the coating material further comprises an additive, wherein the additive comprises at least one of a carbide, a nitride, an oxide, or a silicate.

5. The method of claim 1, wherein the average particle size of the particles in the coating composition is between about 0.01 µm and about 25 µm.

6. The method of claim 1, further comprising applying an inert gas shroud to the coating material during deposition of the coating material on the substrate.

7. The method of claim 1, further comprising depositing one or more additional layers on the bond coat, wherein the one or more additional layers comprise at least one of an environmental barrier coating, a thermal barrier coating, an abradable coating, a bond coat, or a CMAS-resistant layer.

8. The method of claim 7, wherein depositing the one or more additional layers comprises depositing the environmental barrier coating using a suspension thermal spray technique.

9. The method of claim 7, wherein depositing the one or more additional layers comprises depositing the abradable coating using a suspension thermal spray technique.

10. The method of claim 1, wherein the surface of the substrate has the first surface roughness without being mechanically altered to roughen the surface.

11. The method of claim 1, wherein the surface of the substrate is not grit blasted and/or sanded prior to deposition of the coating material.

12. The method of claim 1, further comprising, prior to depositing the coating material to form the bond coat, roughening the surface of the substrate to achieve the first surface roughness.

13. The method of claim 1, wherein the first surface roughness is about 0.76 μm Ra to about 1.27 μm Ra.

14. The method of claim 1, further comprising depositing a flash bond coat directly on a surface of the bond coat, wherein the flash bond coat is deposited to have at least one of a higher porosity or a higher degree of surface roughness than the bond coat.

15. The method of claim 14, wherein depositing the flash bond coat comprises depositing the flash bond coat on the surface of the bond coat via air plasma spraying.

16. The method of claim 14, further comprising depositing one or more additional layers on the flash bond coat, wherein the one or more additional layers comprise at least one of an environmental barrier coating, a thermal barrier coating, an abradable coating, or a CMAS-resistant layer.

17. The method of claim 14, wherein the flash bond coat has substantially the same composition as the bond coat.

18. The method of claim 1, wherein the average particle size of the particles in the coating composition is selected such that a surface of the bond coat formed by the deposition of the coating material exhibits the second surface roughness that is less than the first surface roughness is less than about 25 μm.

\* \* \* \* \*